US008629849B2

(12) United States Patent
Escobedo

(10) Patent No.: US 8,629,849 B2
(45) Date of Patent: Jan. 14, 2014

(54) SPURIOUS INPUT DETECTION SYSTEM

(75) Inventor: Miguel Escobedo, Austin, TX (US)

(73) Assignee: Ebay Inc., San Jose, CA (US)

( * ) Notice: Subject to any disclaimer, the term of this patent is extended or adjusted under 35 U.S.C. 154(b) by 192 days.

(21) Appl. No.: 13/241,595

(22) Filed: Sep. 23, 2011

(65) Prior Publication Data
US 2013/0076644 A1 Mar. 28, 2013

(51) Int. Cl.
*G06F 3/041* (2006.01)
(52) U.S. Cl.
USPC .......................................... 345/173
(58) Field of Classification Search
USPC ................. 345/173–178; 178/18.01–20.04
See application file for complete search history.

(56) References Cited

U.S. PATENT DOCUMENTS

| 2002/0118175 A1 | 8/2002 | Liebenow et al. |
| 2006/0197750 A1 | 9/2006 | Kerr et al. |
| 2006/0238520 A1 | 10/2006 | Westerman et al. |
| 2008/0158146 A1 | 7/2008 | Westerman |
| 2008/0158185 A1 | 7/2008 | Westerman |
| 2008/0211766 A1 | 9/2008 | Westerman et al. |
| 2009/0295753 A1 | 12/2009 | King et al. |
| 2010/0103136 A1* | 4/2010 | Ono et al. ............... 345/173 |
| 2012/0158629 A1* | 6/2012 | Hinckley et al. ........... 706/15 |

OTHER PUBLICATIONS

PCT International Search Report, Application No. PCT/US2012/031259 mailed Jun. 29, 2012.

* cited by examiner

*Primary Examiner* — Bipin Shalwala
*Assistant Examiner* — Hang Lin
(74) *Attorney, Agent, or Firm* — Haynes and Boone, LLP

(57) ABSTRACT

A spurious input detection system includes a touch input display, a touch input surface, and a non-transitory, computer-readable medium. The non-transitory, computer-readable medium includes instructions that, when executed by a processor, provide a spurious input detection engine. The spurious input detection engine is operable to receive a first input from the touch input display and a second input from the touch input surface. The spurious input detection engine is further operable to determine that the first input is a spurious input based on a combination of the first input and the second input. The spurious input detection engine will cause the first input to be disregarded in response to determining that it is a spurious input.

20 Claims, 12 Drawing Sheets

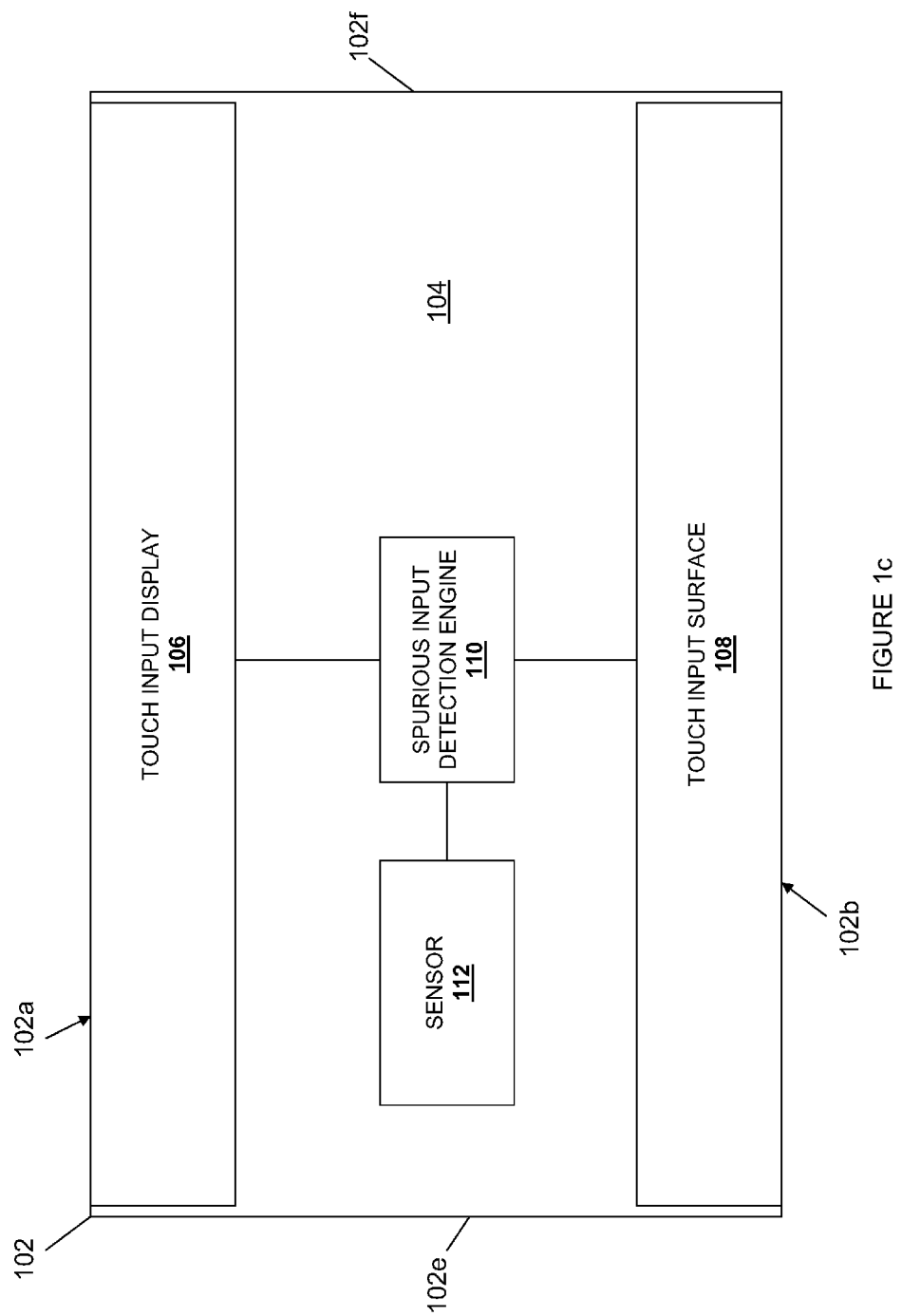

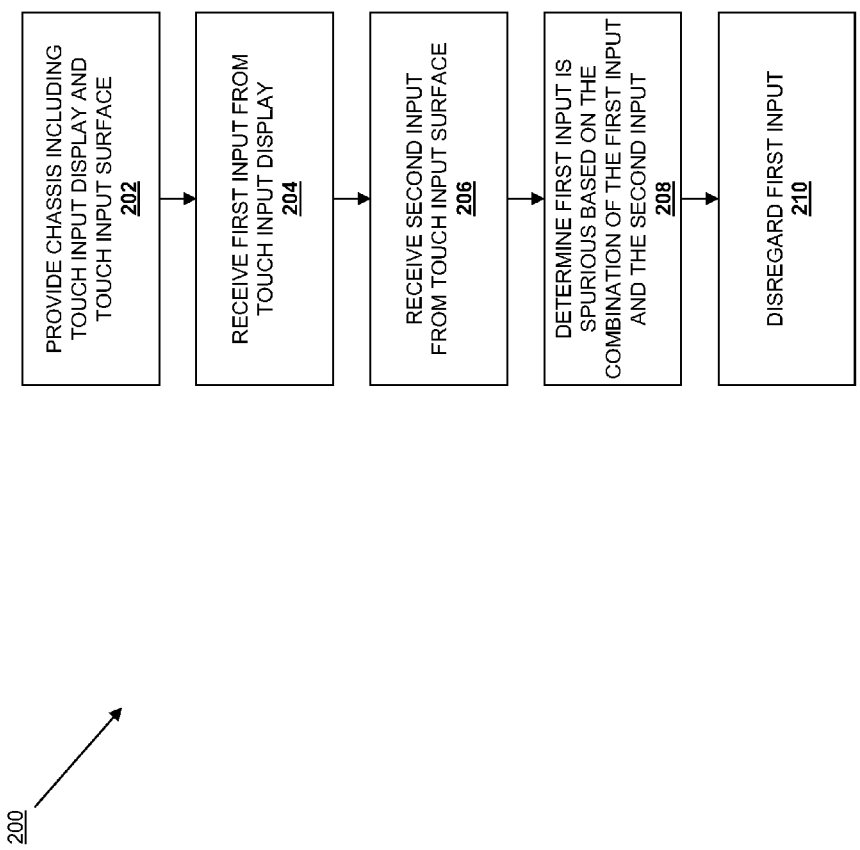

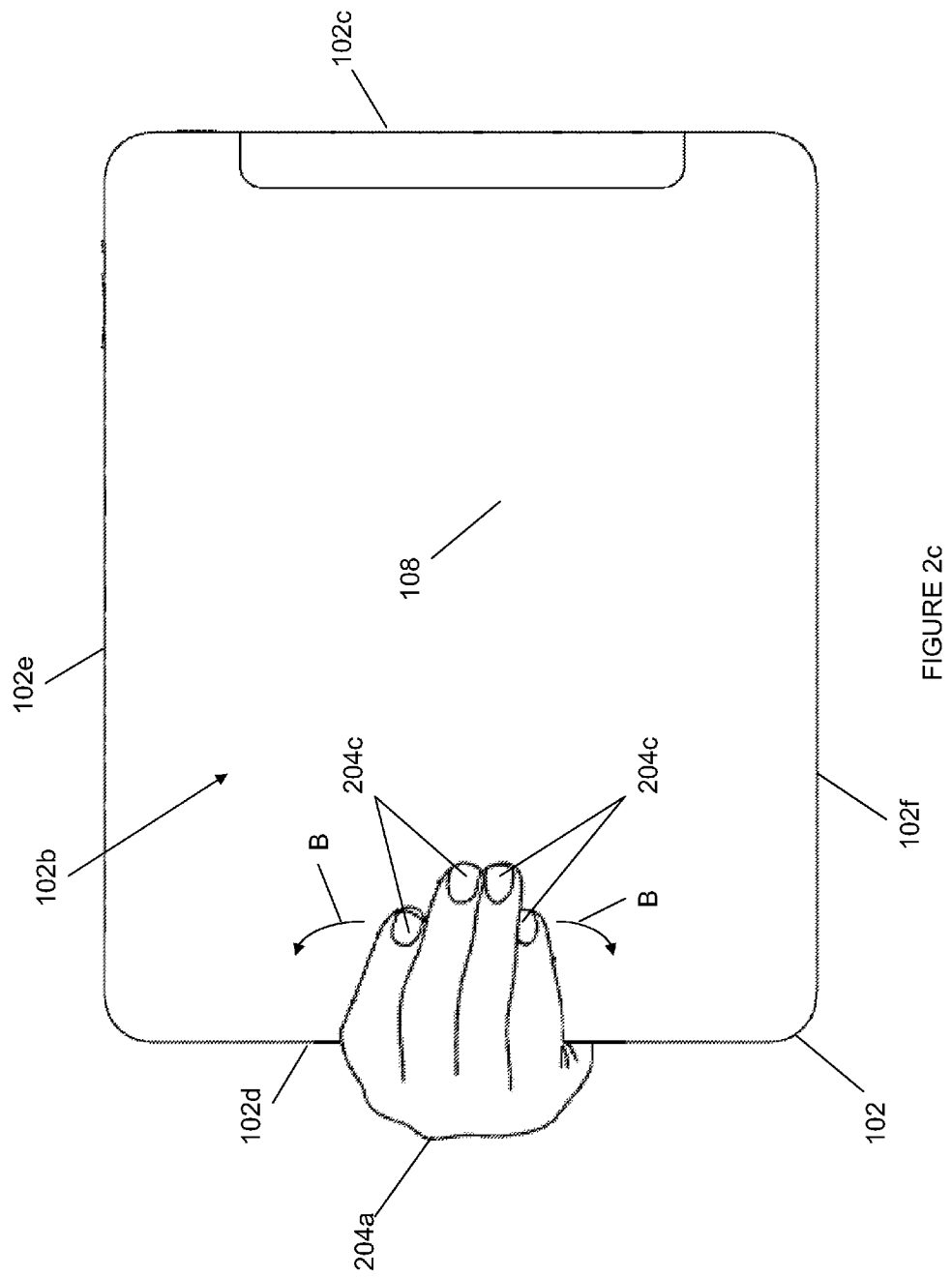

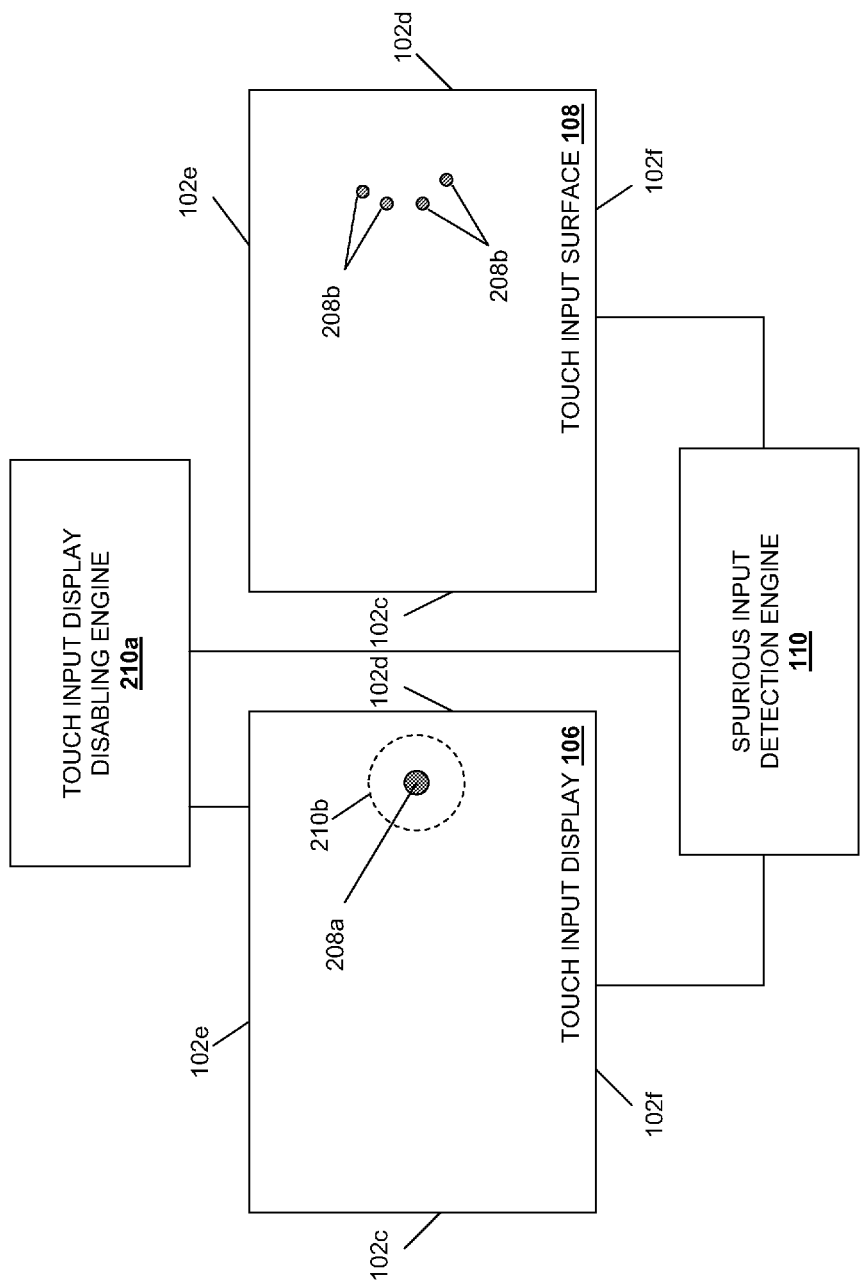

SPURIOUS INPUT DETECTION SYSTEM

BACKGROUND

1. Field of the Invention

The present invention generally relates to touch input display devices and more particularly to a spurious input detection system for a touch input display device.

2. Related Art

Touch input displays for computing and other information handling systems are becoming common as input devices. In particular, phones, tablets, and a variety of other mobile/portable device known in the art have begun incorporating touch input displays that allow users to perform 'tap' inputs, 'swipe' inputs, 'pinch' inputs, and/or a variety of other touch inputs known in the art, in order to provide inputs or instructions to a processor in the device. However, because a user must typically support the device with their hands, spurious or unintentional inputs or instructions to the device may occur as a result of contact between the touch input display and the user's fingers or thumb that are being used to support the device. Such spurious or unintentional inputs can result in a negative user experience.

Conventional solutions to this problem involve providing a border on the device that extends between the edges of the device and the touch input display and that does not allow touch inputs. For example, in conventional tablet devices, a 1 to 1½ inch border is located on the front surface of the tablet device and extends between the edges of the tablet device and the touch input display and about the perimeter of the touch input display. A user may then hold the tablet device by engaging the rear surface of the tablet device with their fingers and the front surface of the tablet device with their thumb, with their thumb positioned within the border such that no inputs are provided on the touch input display. However, such borders limit the size of the touch input display and prevent the touch input display from extending to the edges of the tablet device.

Thus, there is a need for an improved touch input display device.

SUMMARY

According to one embodiment, a spurious input detection system is included in a tablet computing device having a touch input display located on a first side of the tablet computing device and a touch input surface located on a second side of the tablet computing device that is opposite the first side. A non-transitory, computer-readable medium is housed in the tablet device and includes instructions that, when executed by a processor, provide a spurious input detection engine that is operable to receive a first input from the touch input display, receive a second input from the touch input surface, and determine that the first input is a spurious input based on a combination of the first input and the second input. Determination that the first input is a spurious input may result in the spurious input detection engine causing the first input to be disregarded.

In one embodiment, the spurious input detection engine may detect that the first input is a single thumb input and the second input is a plurality of fingers located adjacent a common edge of the touch input surface and, as a result, determine that the first input is a spurious input due to the first input and the second input indicating that a user is holding the tablet device with a single hand. The spurious input detection engine may then detect a third input on the touch input surface that indicates the user is holding the tablet device with two hands and, as a result, determine that the first input is no longer a spurious input. In another embodiment, the spurious input detection system may include a sensor in the tablet device that senses movement and/or orientation changes in the tablet device and, in response, sends a signal to the spurious input detection engine. That signal may be used along with the first and second input to determine whether the first input is a spurious input.

As a result, the touch input display may be extended out to each of a plurality of edges that extend between the first side and the second side of the tablet device, maximizing the touch input display area while preventing spurious or unintentional inputs that result from the user using the touch input display to hold or support the tablet device These and other features and advantages of the present disclosure will be more readily apparent from the detailed description of the embodiments set forth below taken in conjunction with the accompanying figures.

BRIEF DESCRIPTION OF THE FIGURES

FIG. 1*c* is a schematic view illustrating an embodiment of the tablet device of FIGS. 1*a* and 1*b;*

FIG. 2*a* is a flow chart illustrating an embodiment of a method for detecting spurious inputs;

FIG. 2*c* is a rear view illustrating an embodiment of a user providing an input to the tablet device of FIGS. 1*a*, 1*b*, and 1*c;*

FIG. 2*d* is a schematic view illustrating an embodiment of a spurious input detection engine using the inputs illustrated in FIGS. 2*b* and 2*c* to determine whether a spurious input is being provided to the tablet device of FIGS. 1*a*, 1*b*, and 1*c;*

Figure 1A:
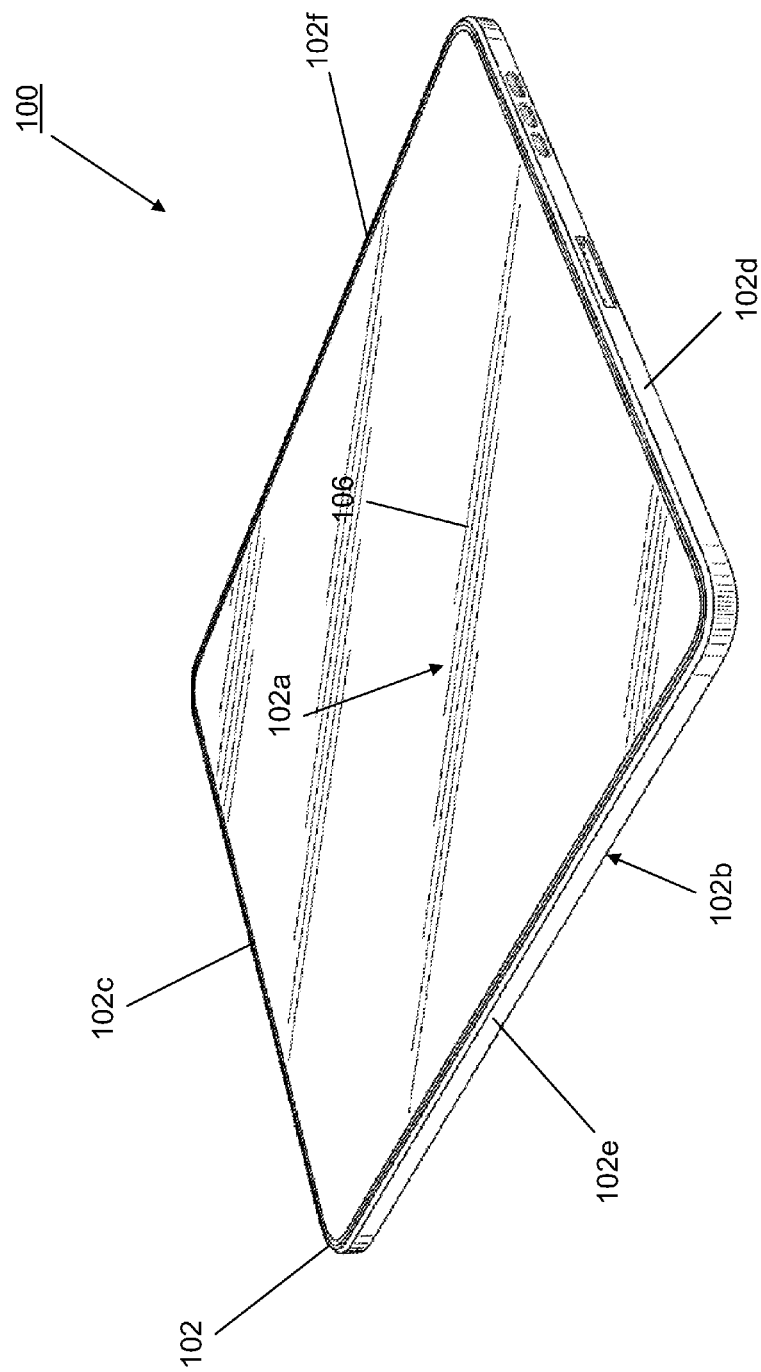
FIG. 1*a* is a front perspective view illustrating an embodiment of a tablet device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for detecting spurious inputs. In one embodiment, the spurious input detection system includes a spurious input detection engine located in a tablet computing device. The spurious input detection engine is coupled to a touch input display and a touch input surface that are located on opposite sides of the touch input device. The spurious input detection engine receives inputs from both the touch input display and the touch input surface and uses those inputs to determine whether the inputs received from the touch input display are spurious or unintentional inputs provided by a user as a result of the user attempting to hold or otherwise support the tablet device using the touch input display. For example, combinations of inputs on the touch input display and the touch input surface may be interpreted by the spurious input detection engine as a single hand of the user being used to support the tablet device, and thus the input on the touch input display may then be determined to be spurious (e.g., an input that occurs as a result of the need to hold or support the table device rather than an input meant to select something that is being displayed on the touch input display and/or provide instructions to a processor). Spurious inputs may then be disregarded or otherwise not used to cause the table device to perform an action. The spurious input detection system allows the touch input display to extend to the edges of the tablet device without resulting in spurious inputs from a user that result from holding the tablet device using at least a portion of the touch input display.

Figure 1B:
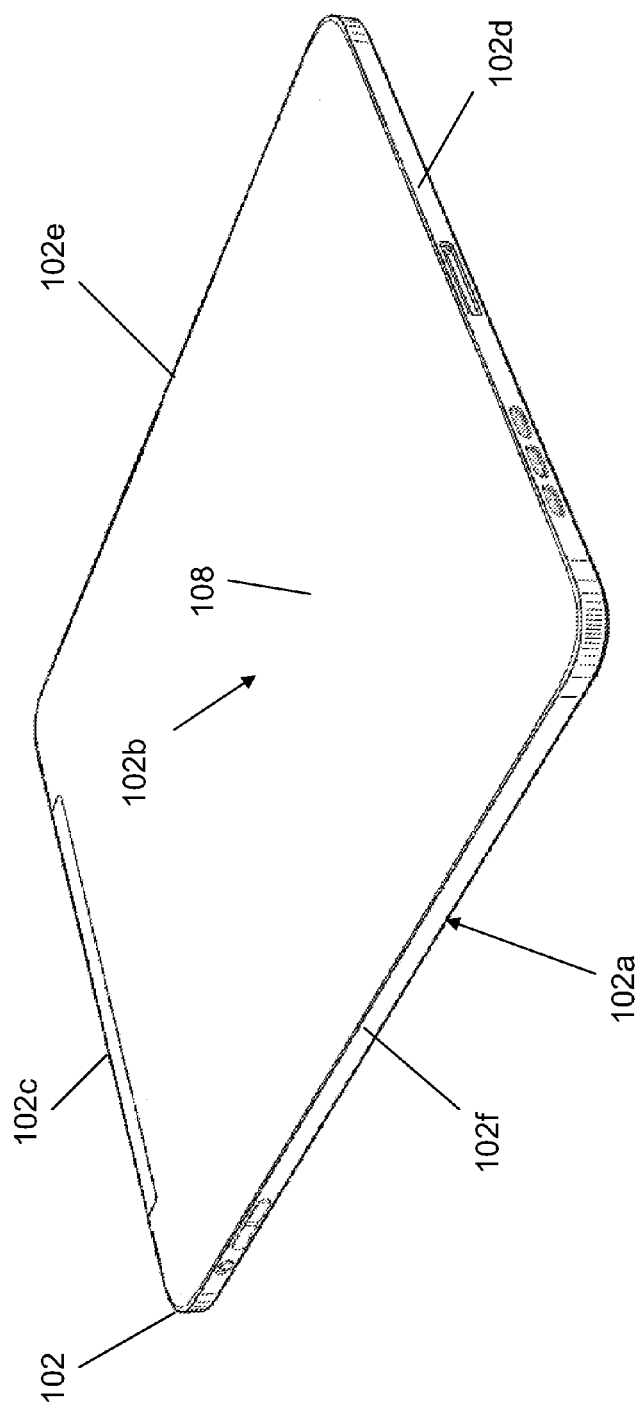
FIG. 1*b* is a rear perspective view illustrating an embodiment of the tablet device of FIG. 1*a;*

Referring now to FIGS. 1a, 1b, and 1c, a spurious input detection system is illustrated. In the embodiment illustrated and described below, the spurious input detection system is included on a tablet computing device 100. However, one of skill in the art will recognize that the spurious input detection system may be provided on a variety of devices other than tablet computing devices (e.g., phones, laptop computers, and/or a variety of other portable/mobile computing devices known in the art) while remaining within the scope of the present disclosure. The tablet computing device 100 includes a tablet chassis 102 having a front surface 102a, a rear surface 102b located opposite the tablet chassis 102 from the front surface 102a, a top edge 102c extending between the front surface 102a and the rear surface 102b of the tablet chassis 102, a bottom edge 102d located opposite the tablet chassis 102 from the top edge 102c and extending between the front surface 102a and the rear surface 102b of the tablet chassis 102, and a pair of side edges 102e and 102f located opposite the tablet chassis 102 from each other and extending between the front surface 102a, the rear surface 102b, the top edge 102c, and the bottom edge 102d. A tablet housing 104 is defined by the tablet chassis 102 between the front surface 102a, the rear surface 102b, the top edge 102c, the bottom edge 102d, and the side edges 102e and 102f.

A touch input display 106 is included on the tablet computing device 100. In the illustrated embodiment, the touch input display 106 is housed in the tablet housing 104 and located on the tablet chassis 102 such that the touch input display 106 provides the front surface 102a of the tablet chassis 102. As can be seen in the embodiment illustrated in FIG. 1a, the touch input display 106 extends between the top edge 102c, the bottom edge 102d, and the side edges 102e and 102f of the tablet chassis 102. In an embodiment, the touch input display 106 is a capacitive touch input display device that is operable to display images on the portion of the touch input display 106 that provides the front surface 102a of the tablet chassis 102, receive inputs from a user on the portion of the touch input display 106 that provides the front surface 102a of the tablet chassis 102 by detecting capacitance changes that result from the users fingers engaging or being positioned proximate to the touch input display 106, and/or provide a variety of other touch input display functionality known in the art. While a capacitive touch input display device is illustrated and described below, one of skill in the art will recognize that a variety of other touch input display devices may be used in the spurious input detection system without departing from the scope of the present disclosure.

A touch input surface 108 is included on the tablet computing device 100. In the illustrated embodiment, the touch input surface 108 is housed in the tablet housing 104 and located on the tablet chassis 102 such that the touch input surface 108 provides some or all of the rear surface 102b of the tablet chassis 102. In the embodiment illustrated in FIG. 1b, the touch input surface 108 extends between the top edge 102c, the bottom edge 102d, and the side edges 102e and 102f of the tablet chassis 102. In other embodiments, the touch input surface 108 may include a plurality of touch input surfaces that provide portions of the rear surface 102b of the tablet chassis 102. For example, separate and/or integrated touch input surfaces may be provided adjacent the top edge 102c, the bottom edge 102d, and/or the side edges 102e and 102f of the tablet chassis 102 such that those touch input surfaces extend along the rear surface 102b of the tablet chassis a predetermined distance (e.g., 2 inches) from their respective adjacent edges. In other examples, the touch input surface 108 may include one or more touch input surfaces shaped and/or dimensioned to optimize the detection of spurious inputs, as discussed below.

In an embodiment, the touch input surface 108 is a capacitive touch input device that is operable to receive inputs from a user on the portion or portions of the touch input surface 108 that provides the rear surface 102b of the tablet chassis 102 by detecting capacitance changes that result from the users fingers engaging or being positioned proximate to the touch input surface 108, and/or provide a variety of other touch input surface functionality known in the art. While a capacitive touch input surface device is illustrated and described below, one of skill in the art will recognize that a variety of other touch input surface devices may be used in the spurious input detection system without departing from the scope of the present disclosure. Furthermore, while the touch input surface 108 is illustrated an described as a non-display touch input surface, one of skill in the art will recognize that the touch input surface 108 may be replaced with a touch input display device that is similar to the touch input display 106 discussed above.

A spurious input detection engine or processor 110 is included in the spurious input detection system and, in the illustrated embodiment, is located in the tablet housing 104. In an embodiment, the tablet housing 104 houses a processor and a non-transitory, computer-readable medium. The non-transitory, computer-readable medium includes instructions that, when executed by the processor, cause the processor to provide the spurious input detection engine 110. The spurious input detection engine 110 is coupled to both the touch input display 106 and the touch input surface 108 through, for example, their coupling to the processor that provides the spurious input detection engine 110. A sensor 112 may be located in the tablet housing 104 and coupled to the spurious input detection engine 110. In an embodiment the sensor 112 may be one or more sensors. In an embodiment, the sensor 112 includes an accelerometer or other sensor that is operable to determine an acceleration of the tablet chassis 102, a gyroscope or other sensor that is operable to determine an orientation of the table chassis 102, and/or a variety of other sensors known in the art.

Figure 2B:
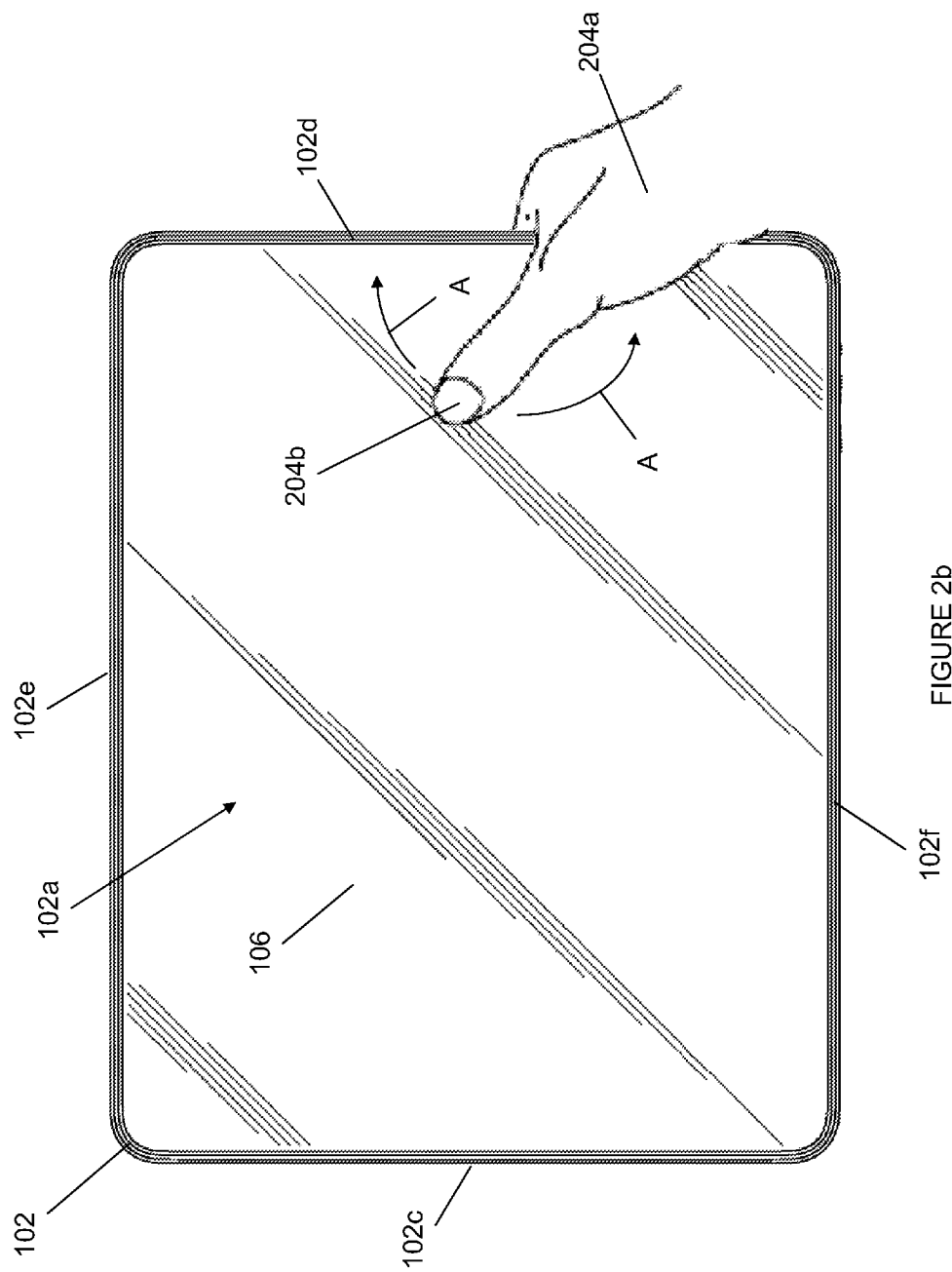
FIG. 2*b* is a front view illustrating an embodiment of a user providing an input to the tablet device of FIGS. 1*a*, 1*b*, and 1*c;*

Referring now to FIGS. 2a, 2b, 2c, and 2d, a method 200 for detecting spurious or unintentional inputs is illustrated. The method 200 begins at block 102 where a chassis including a touch input display and a touch input surface is provided. In an embodiment, the tablet computing device 100, described above with reference to FIGS. 1a, 1b, and 1c, is provided. However, in other embodiments, a variety of different devices including a touch input display and a touch input surface (e.g., a phone, a laptop computing device, and/or a variety of other devices known in the art) may be provided without departing from the scope of the present disclosure. The method 100 then proceeds to block 204 where a first input is received from the touch input display. FIGS. 2b and 2c illustrate the tablet computing device 100 being held and/or supported by a user with a single hand 204a located adjacent the bottom edge 102d of the tablet chassis 102. As illustrated in FIG. 2b, holding and/or supporting the tablet computing device 100 with a single hand 204a adjacent the bottom edge 102d of the tablet chassis 102 results in a thumb 204b engaging the touch input display 106. The engagement of the thumb 204b with the touch input display 106 provides a first input on the touch input display 106 that is sent to and received by the spurious input detection engine 110. Furthermore, movement of the thumb 204b along the touch input display 106 (illustrated by the arrows A in FIG. 2b), removal of the thumb 204b from the touch input display 106 and subsequent replacement of the thumb 204b back on the touch input display 106 (i.e., a "tap"), and/or a variety of other thumb actions and/or repositioning may provide the first input on the touch input display 106 that is sent to and received by the spurious input detection engine 110. While the single hand 204a is illustrated and described as holding and/or supporting the tablet computing device 100 adjacent the bottom edge 102d of the tablet chassis 102, one of skill in the art will recognize that the single hand 204a may hold and/or support the tablet computing device 100 adjacent the other edges (e.g., the top edge 102c, the side edge 102e, or the side edge 102o or combinations of edges (e.g., the corner between the top edge 102c and the side edge 102e) while still providing a first input on the touch input display 106 that is within the scope of the present disclosure.

The method 200 then proceeds to block 206 where a second input is received from the touch input surface, although in different embodiments, block 204 and 206 can be performed simultaneously or in a different order. As illustrated in FIG. 2c, holding and/or supporting the tablet computing device 100 with a single hand 204a adjacent the bottom edge 102d of the tablet chassis 102 results in a plurality of fingers 204c engaging the touch input surface 108. The engagement of the plurality of fingers 204c with the touch input surface 108 provides a second input on the touch input surface 108 that is sent to and received by the spurious input detection engine 110. Furthermore, movement of any or all of the plurality of fingers 204c along the touch input surface 108 (illustrated by the arrows B in FIG. 2c), removal of any or all of the plurality of fingers 204c from the touch input surface 108 and subsequent replacement of any or all of the plurality of fingers 204c back on the touch input surface 108, and/or a variety of other finger actions and/or repositioning may provide the second input on the touch input surface 108 that is sent to and received by the spurious input detection engine 110. While the single hand 204a is illustrated and described as holding and/or supporting the tablet computing device 100 adjacent the bottom edge 102d of the tablet chassis 102, one of skill in the art will recognize that the single hand 204a may hold and/or support the tablet computing device 100 adjacent the other edges (e.g., the top edge 102c, the side edge 102e, or the side edge 102o or combinations of edges (e.g., the corner between the top edge 102c and the side edge 102e) while still providing a second input on the touch input surface 108 that is within the scope of the present disclosure.

The method 200 then proceeds to block 208 where the first input is determined to be a spurious input based on the combination of the first input and the second input. FIG. 2d illustrates a schematic of the touch input display 106, the touch input surface 108, and the spurious input detection engine 110. The first input on the touch input display 106 that is received by the spurious input detection engine 110 in block 204 of the method 200 is represented by a first input area 208a. In an embodiment, the spurious input detection engine 110 is programmed with the dimensions and the edges of the touch input display 106 (which correspond to the edges 102c, 102d, 102e, and 102f of the tablet chassis 102) and/or other information about the touch input display 106. Thus, if the first input on the touch input display 106 is received by the spurious input detection engine 110 as a plurality of coordinates that indicate the location of the first input relative to the touch input display 106, the first input area 208a indicates where on the touch input display 106 the thumb 204b of the user is engaging the touch input display 106 (as illustrated in FIGS. 2b and 2d). The second input on the touch input surface 108 that is received by the spurious input detection engine 110 in block 204 of the method 200 is represented by a plurality of second input areas 208b. In an embodiment, the spurious input detection engine 110 is programmed with the dimensions and the edges of the touch input surface 108 (which correspond to the edges 102c, 102d, 102e, and 102f of the tablet chassis 102) and/or other information about the touch input screen 108. Thus, if the second input on the touch input surface 108 is received by the spurious input detection engine 110 as a plurality of coordinates that indicate the location of the second input relative to the touch input surface 108, the second input areas 208b indicate where on the touch input surface 108 the plurality of fingers 204c of the user are engaging the touch input surface 108 (as illustrated in FIGS. 2c and 2d).

The spurious input detection engine 110 may include a plurality of pre-programmed and/or user provided spurious input configurations that include combinations of first input on the touch input display 106 and the second input on the touch input surface 108. In an embodiment, combinations of the first input on the touch input display 106 and the second input on the touch input surface 108 that indicate that a user is holding the tablet computing device 100 with one hand may be provided as spurious input configurations that will cause the spurious input detection engine 110 to determine that the first input is being provided on the touch input display 106 is a spurious input. For example, a spurious input configuration may include the first input on the touch input display 106 represented by the first input area 208a and the second input on the touch input surface 108 represented by the second input area 208b. Furthermore, the spurious input configuration may include the first input on the touch input display 106 represented by the first input area 208a and the second input on the touch input surface 108 represented by the second input areas 208b being located adjacent a common edge of the touch input display 106 (e.g., the edge 102d of the tablet chassis in the illustrated embodiment) such that a spurious input will be detected whenever the user holds and/or supports the tablet computing device 100 with a single hand 204a.

While a first input on the touch input display 106 has been illustrated and described as a single thumb 204b providing that input and the second input on the touch input surface 108 has been illustrated and described as a plurality of fingers 204c providing that input, one of skill in the art will recognize that the first input and second input may be provided in a variety of different ways and may include a variety of different configurations that trigger the determination of a spurious input configuration while remaining within the scope of the present disclosure. For example, portions of the fingers, thumb, and/or hand 204a of the user may provide the first and/or second inputs to the touch input display 106 and/or the touch input surface 108 (e.g., the side of a finger or thumb or a portion of the palm of the hand 204a of the user may provide some or all of an input or inputs). In another example, multiple touch input areas may be determined on the touch input display (e.g., from multiple thumbs of the user engaging the touch inputs display 106) and multiple touch input areas may be determined on the touch input surface (e.g., from fingers or the palm of the user) and still result in the determination of a spurious input due to the locations of those touch input areas on the touch input display 106 and the touch input surface 108 indicating that they are needed to hold and/or support the tablet computing device 100 and therefore should be disregarded.

One of skill in the art will recognize that the physical capabilities and limitations of a users hands will allow a plurality of spurious input configurations to be determined that are based on combinations of the fingers, thumbs, and/or other portions of the hands in engagement with the touch input device that indicate how that device is being handled and thus whether an input is intentional or not. For example, because the fingers and thumb on a hand are limited in their relative placement and positioning, it may be determined when inputs on the opposite sides of the tablet computing device 100 are from a single hand or two hands. Furthermore, typical touch input device holding configurations (e.g., the positioning of a users hand or hands in holding the device) may be determined such that finger inputs, thumb inputs, palm inputs, and other inputs from other portions of a users hand or hands may be quickly recognized by the spurious input detection engine 110.

The method 100 then proceeds to block 210 where the first input is disregarded. In response to determining that a spurious input is being provided on the touch input display 106, the spurious input detection engine 110 operates to cause the first input on the touch input display 106 to be disregarded. In an embodiment, in response to determining that a spurious input is being provided, the spurious input detection engine 110 communicates the first input area 208a to a touch input display disabling engine 210a. In an embodiment, the touch input display disabling engine 210a may include instructions that are stored on a non-transitory, computer-readable medium that is housed in the tablet chassis 102 and that is coupled to a processor. The instructions on the computer-readable medium may be executed by the processor to cause the processor to provide the touch input display disabling engine 210a that, in response to receiving the first input area 208a, is operable to disable a portion 210b of the touch input display 106 that is adjacent the first input area 208a, as illustrated in FIG. 2d. The disabling the portion 210b of the touch input display 106 causes any inputs within the portion 210b of the touch input display 106 (including the first input represented by the touch input area 208a) to be disregarded (e.g., not used to perform an action that would otherwise be performed in response to that input).

In another embodiment, the touch input display 106 may not be disabled by the touch input display disabling engine 210a, and rather the spurious input detection engine 110 may receive all inputs transmitted from the touch input display 106 and remove any inputs that are determined to be spurious (e.g., the first input on the touch input display 106 represented by the first input area 208a may be removed) before transmitting the non-spurious inputs from the touch input display 106 to the processor such that the processor may perform actions according to those inputs. Thus, the determination of a spurious input configuration based on the first input on the touch input display 106 and the second input on the touch input surface 108 causes the first input on the touch input display 106 to be disregarded as that first input is being used to hold and/or support the tablet computing device 100 and is not meant to be providing an input to the processor to perform an action.

In another embodiment, the sensor 112 may be used to determine whether a spurious input is being provided. As discussed above, the sensor 112 may be operable to detect movement of the tablet computing device 100, the orientation of the tablet computing device 100, and/or a variety of other physical conditions of the tablet computing device 100, and send a signal to the spurious input detection engine 110 that indicates that physical condition of the tablet computing device.

In one example, the first input on the touch input display 106 represented by the first input area 208a and the second input on the touch input display 108 represented by the second input areas 208b may be provided, followed by the sensor 112 detecting movement or acceleration of the tablet computing device 100 and sending a signal indicating that movement or acceleration to the spurious input detection engine 110, followed by additional inputs on the touch input display 106 and/or the touch input surface 108. The spurious input configurations discussed above may include the combination of the first input on the touch input display 106 represented by the first input area 208a and the second input on the touch input display 108 represented by the second input areas 208b, the signal indicating movement or acceleration of the tablet computing device 100, and the additional inputs on the touch input display 106 and/or the touch input surface 108, as those inputs and movement may indicate that the tablet computing device 100 is being physically handed or passed to another user. Thus, upon such a spurious input configuration being detected, the spurious input detection engine 110 may cause some or all of the inputs provided on the touch input display 106 to be disregarded such that the tablet device 100 may be passed between users without an unintentional inputs being provided.

In another example, the first input on the touch input display 106 represented by the first input area 208a and the second input on the touch input display 108 represented by the second input areas 208b may be provided, followed by the sensor 112 detecting an orientation or a change in orientation of the tablet computing device 100 and sending a signal indicating that orientation or change in orientation to the spurious input detection engine 110, followed by additional inputs on the touch input display 106 and/or the touch input surface 108. The spurious input configurations discussed above may include the combination of the first input on the touch input display 106 represented by the first input area 208a and the second input on the touch input display 108 represented by the second input areas 208b, the signal indicating orientation or orientation change of the tablet computing device 100, and the additional inputs on the touch input display 106 and/or the touch input surface 108, as those inputs and movement may indicate that the tablet computing device 100 is being physically handed or passed to another user. Thus, upon such a spurious input configuration being detected, the spurious input detection engine 110 may cause some or all of the inputs provided on the touch input display 106 to be disregarded such that the tablet device 100 may be passed between users without an unintentional input being provided.

In other examples, combinations of movement, acceleration, orientation, and/or orientation change may be included with input combinations to provide spurious input configurations that, when determined by the spurious input detection engine 110, result in the one or more of the inputs on the touch input display 106 being disregarded. Furthermore, spurious input configurations may include factors other than inputs on the touch input display 106 and the touch input surface 108 and signals sent by the sensor 112. In an embodiment, a clock or other timer may be coupled to the spurious input detection engine 110 and used to help determine whether an input on the touch input display 106 is a spurious input. For example, the time interval measured between inputs on the touch input display 106, the touch input surface 108, movement of the tablet computing device 100, and/or orientation changes in the tablet computing device 100 may indicate whether the input on the touch input display 106 is a spurious input and thus should be disregarded.

Figure 3A:
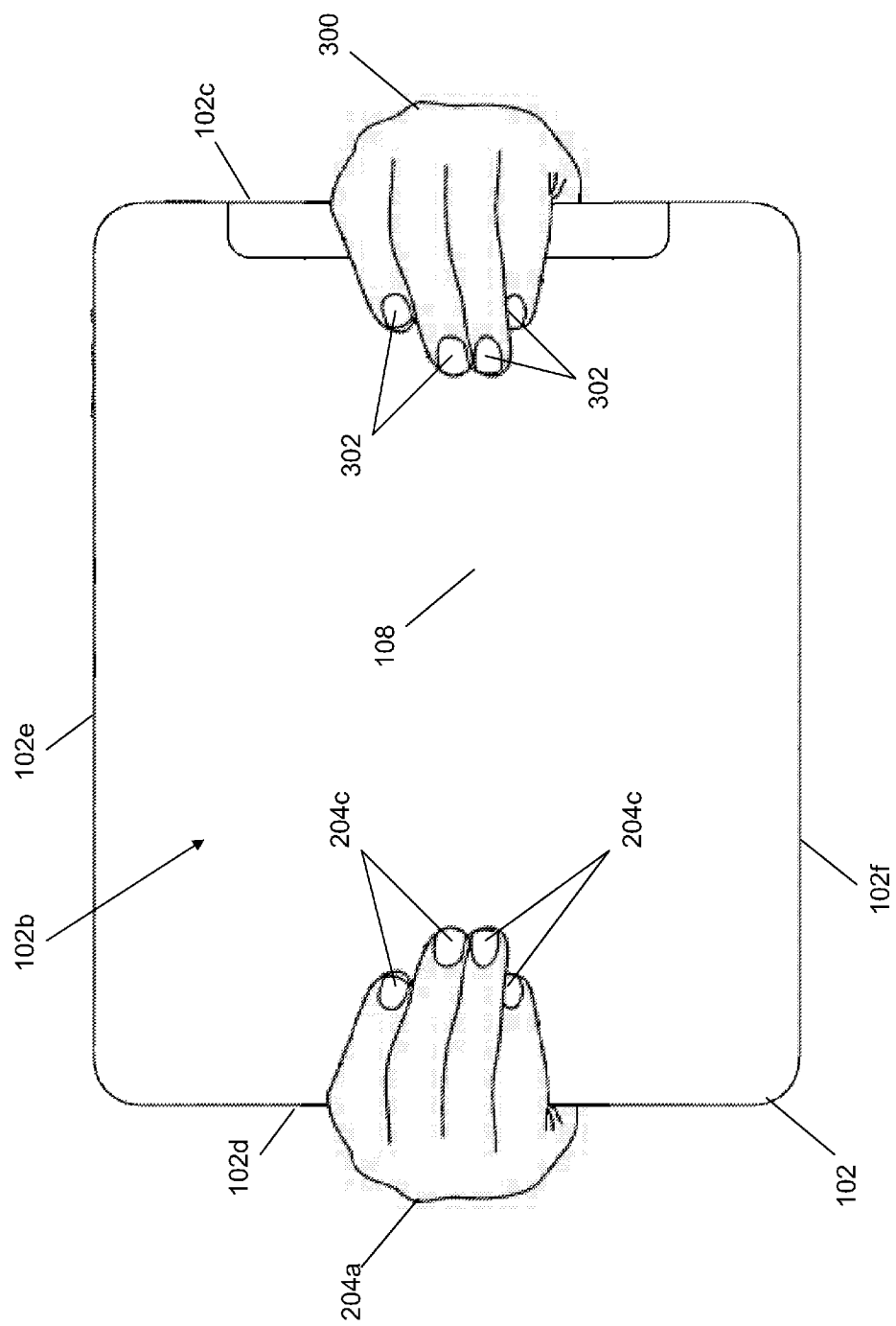
FIG. 3*a* is a front view illustrating an embodiment of a user providing inputs to the tablet device of FIGS. 1*a*, 1*b*, and 1*c;*

Referring now to FIG. 3a, the first input on the touch input display 106 may be disregarded until an additional input is provided to the touch input display 106 and/or the touch input surface 108 that results in the combination of inputs on the touch input display 106 and the touch input surface 108 no longer being included in the spurious input configurations. For example, the user of the tablet computing device 100 may choose to hold and/or support the tablet computing device 100 using a second hand 300. In an embodiment, holding and/or supporting the tablet computing device 100 with the second hand 300 results in a plurality of fingers 302 on the second hand 300 engaging the touch input surface 108 adjacent the top edge 102c of the tablet chassis 102, as illustrated in FIG. 3a. The engagement of the plurality of fingers 302 with the touch input surface 108 provides a third input on the touch input surface 108 that is sent to and received by the spurious input detection engine 110. While the second hand 300 is illustrated and described as holding and/or supporting the tablet computing device 100 adjacent the top edge 102c of the tablet chassis 102, one of skill in the art will recognize that the second hand 300 may hold and/or support the tablet computing device 100 adjacent the other edges (e.g., the bottom edge 102d, the side edge 102e, or the side edge 102f) or combinations of edges (e.g., the corner between the top edge 102c and the side edge 102e) while still providing a third input on the touch input surface 108 that is within the scope of the present disclosure.

Figure 3B:
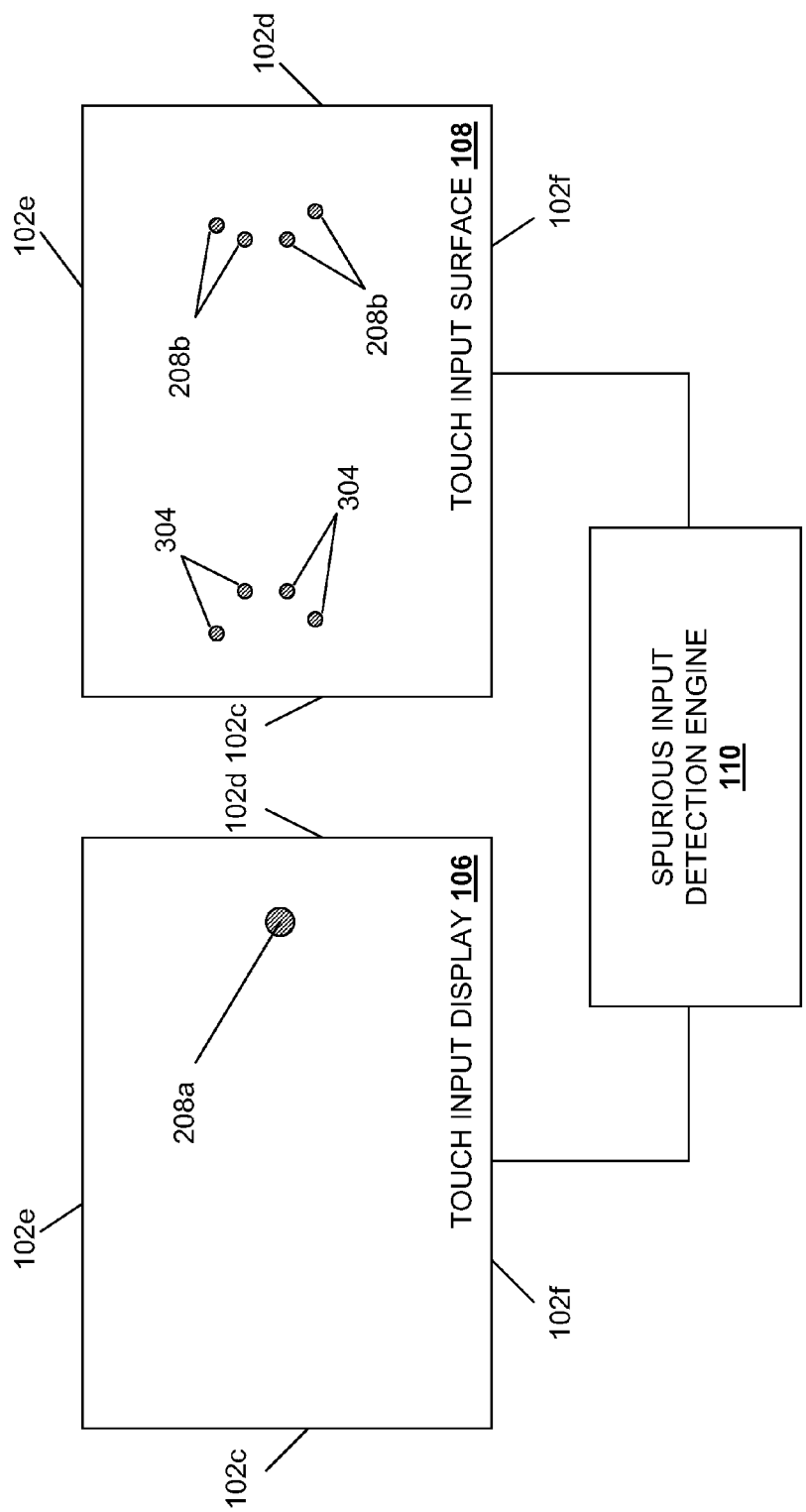
FIG. 3*b* is a schematic view illustrating an embodiment of a spurious input detection engine using the inputs illustrated in FIGS. 2*b* and 3*a* to determine whether a spurious input is being provided to the tablet device of FIGS. 1*a*, 1*b*, and 1*c;*

Referring now to FIG. 3b, the third input on the touch input surface 108 that is received by the spurious input detection engine 110 in block 204 of the method 200 is represented by a plurality of third input areas 304. In an embodiment, the spurious input detection engine 110 is programmed with the dimensions and the edges of the touch input surface 108 (which correspond to the edges 102c, 102d, 102e, and 102f of the tablet chassis 102) and/or other information about the touch input surface 108. Thus, if the third input on the touch input surface 108 is received by the spurious input detection engine 110 as a plurality of coordinates that indicate the location of the third input relative to the touch input surface 108, the third input areas 304 indicate where on the touch input surface 108 the plurality of fingers 204c of the user are engaging the touch input surface 108 (as illustrated in FIGS. 3a and 3b). Further, the combination of the second inputs on the touch input surface 108 represented by the second input areas 208b and the third inputs on the touch input surface 108 represented by the third input areas 304 may not be included in the spurious input configurations provided to the spurious input detection engine 110 due to those inputs indicating that the user is holding and/or supporting the tablet computing device 100 with two hands. Thus, in response to receiving the third input on the touch input surface 108 represented by the third input areas 304, the spurious input detection engine 110 may determine that the first input on the touch input display 106 is no longer a spurious input (due to the combination of the second and third inputs on the touch input surface 108 being provided).

The spurious input detection engine 110 may perform a variety of actions in response to determining that the first input on the touch input display 106 is no longer a spurious input. For example, upon determining that the first input on the touch input display 106 represented by the first input area 208a is no longer a spurious input, the spurious input detection engine 110 may continue to cause the first input on the touch input display 106 to be disregarded. However, upon detecting that the first input on the touch input display 106 has been removed, following by receiving a fourth input on the touch input display 106 that is in substantially the same location as the first input was, the fourth input may be treated as a user input (e.g., provided to the processor as a user input of instructions for the processor). Thus, a user may support the tablet computing device 100 with a single hand 204a using a thumb 204b on the touch input display 106 and a plurality of fingers 204c on the touch input surface 108, and an input resulting from the engagement of the thumb 204b and the touch input display 106 will be disregarded. Then, upon supporting the tablet computing device 100 with a plurality of fingers 302 on a second hand 300, the input resulting from the engagement of the thumb 204b and the touch input display 106 will continue to be disregarded until that thumb 204b is disengaged from the touch input display 106 and then re-engaged with the touch input display 106 in substantially the same location, at which time the input resulting from the engagement of the thumb 204b and the touch input display 106 with be provided to the processor as a user input. In another example, upon determining that the first input on the touch input display 106 is no longer a spurious input, the spurious input detection engine 110 may continue to disregard the first input for a predetermined amount of time (e.g., 2 seconds), after which the first input on the touch input display 106 will be provided to the processor as a user input.

Figure 3C:
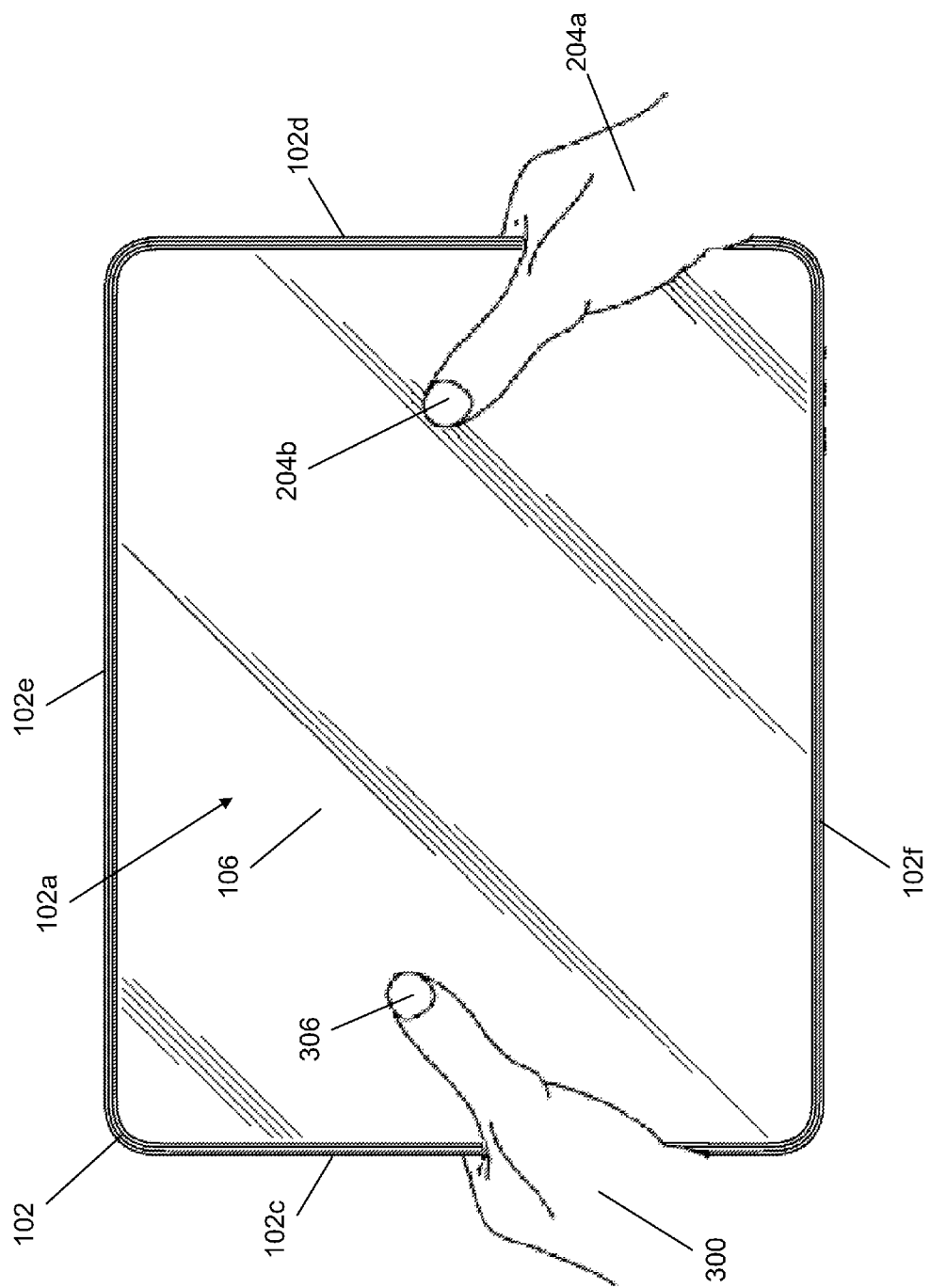
FIG. 3*c* is a rear view illustrating an embodiment of a user providing inputs to the tablet device of FIGS. 1*a*, 1*b*, and 1*c;*
Figure 3D:
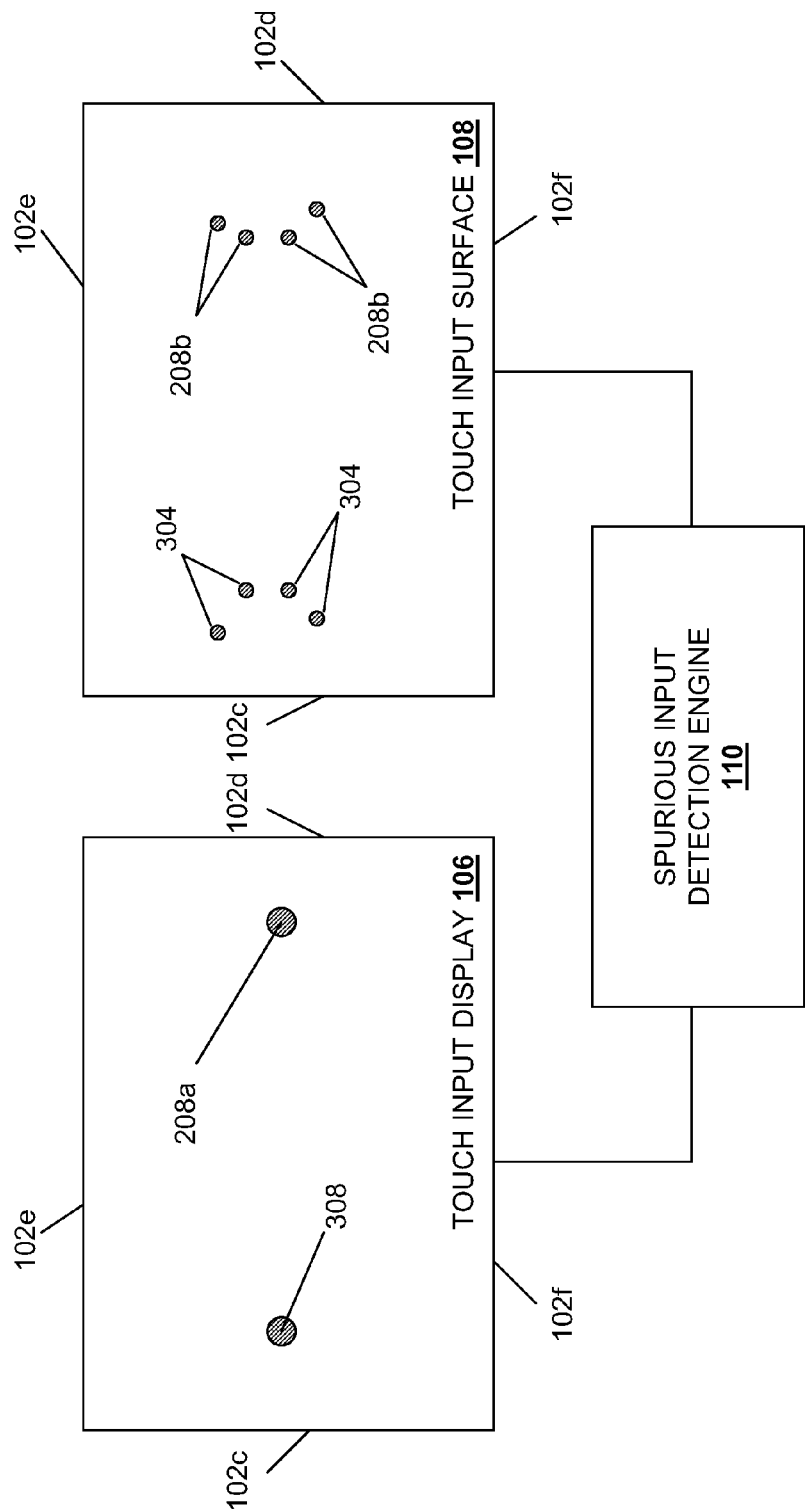
FIG. 3*d* is a schematic view illustrating an embodiment of a spurious input detection engine using the inputs illustrated in FIGS. 3*a* and 3*c* to determine whether a spurious input is being provided to the tablet device of FIGS. 1*a*, 1*b*, and 1*c*.

Referring now to FIG. 3c, in another example, holding and/or supporting the tablet computing device 100 with the second hand 300 results in a thumb 306 on the second hand 300 engaging the touch input display 106 adjacent the top edge 102c of the tablet chassis 102, as illustrated in FIG. 3c. The engagement of the thumb 306 with the touch input display 106 provides a fourth input on the touch input display 106 that is sent to and received by the spurious input detection engine 110. Referring now to FIG. 3d, the fourth input on the touch input display 106 that is received by the spurious input detection engine 110 is represented by a fourth input area 308. Because the combination of the second input on the touch input surface 108 represented by the second input areas 208b and the third input on the touch input surface 108 represented by the third input areas 304 result in the inputs not being included in the spurious input configurations provided to the spurious input detection engine 110 due to those inputs indicating that the user is holding and/or supporting the tablet computing device 100 with two hands, the fourth input on the touch input display 106 represented by the fourth input area 308 will not be disregarded and may be used immediately to provide user inputs to the processor. As discussed above, in an embodiment, the first input on the touch input display 106 represented by the first input area 208a may be disregarded until it is disengaged from the touch input display 106, a predetermined time elapses, etc.

Thus, a spurious input detection system has been described that allows inputs to a touch input display on a computing device to be disregarded based on a combination of inputs provided to the touch input display and a touch input surface on the computing device that indicate whether the inputs on the touch input display are intentional or a result of the need for the user to hold and/or support the computing device. Such a system allows the touch input display to be extended substantially across an entire side of the computing device because system allows that touch input display to be used to hold and/or support the computing device without providing an input to the system, which allows for computing devices with larger touch input displays.

Figure 4:
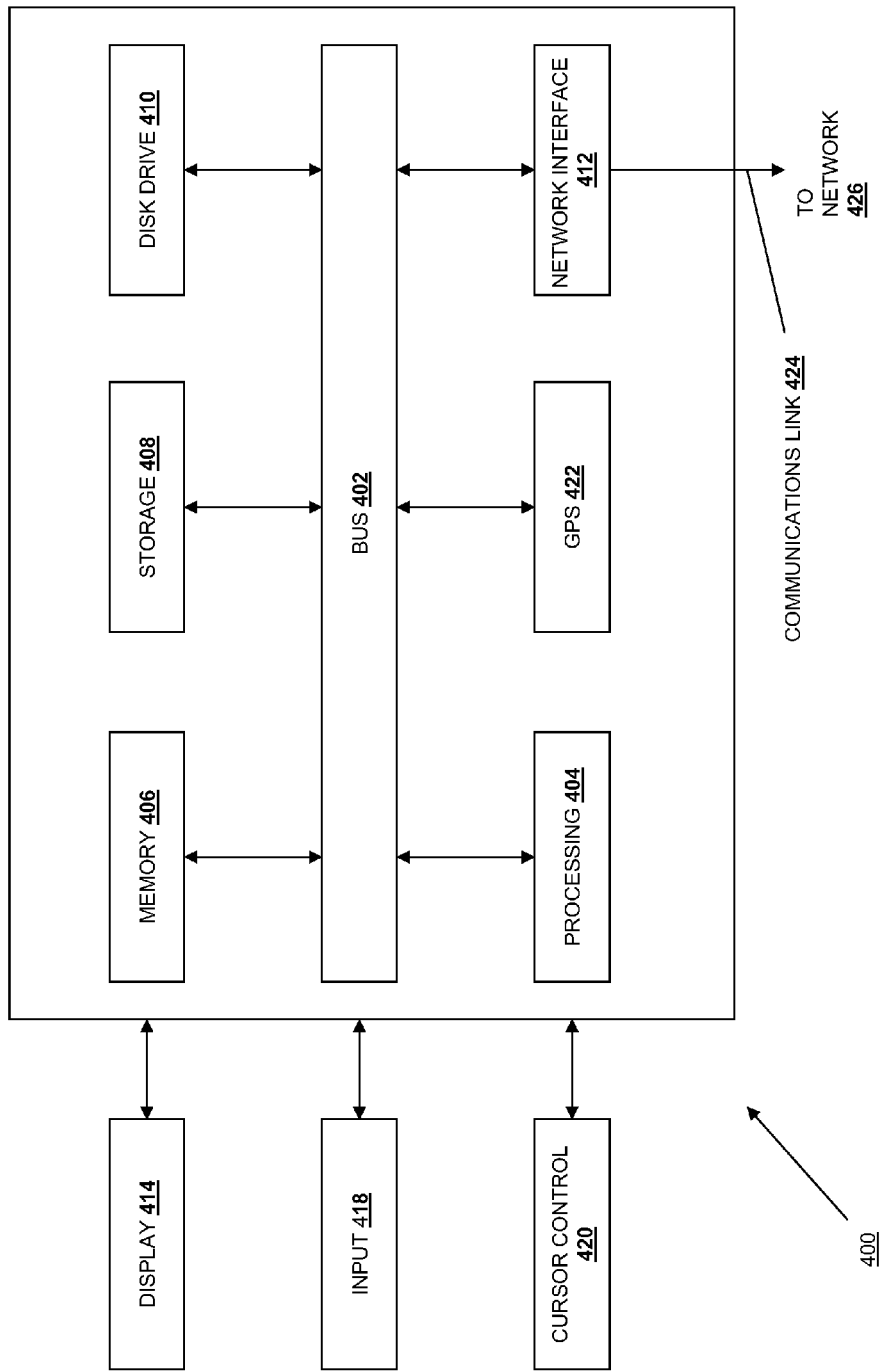
FIG. 4 is a schematic view illustrating an embodiment of a computer system.

Referring now to FIG. 4, an embodiment of a computer system 400 suitable for implementing the spurious input detection system and/or the tablet computing device 100, is illustrated. It should be appreciated that other devices incorporating the spurious input detection system other than the tablet computing device discussed above may be implemented as the computer system 800 in a manner as follows.

In accordance with various embodiments of the present disclosure, computer system 400 includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), and/or a location determination component 422 (e.g., a Global Positioning System (GPS) device as illustrated, a cell tower triangulation device, and/or a variety of other location determination devices known in the art.) In one implementation, the disk drive component 410 may comprise a database having one or more disk drive components.

In accordance with embodiments of the present disclosure, the computer system 400 performs specific operations by the processor 404 executing one or more sequences of instructions contained in the memory component 406, such as described herein with respect to the spurious input detection system and/or the table computing device 100. Such instructions may be read into the system memory component 406 from another computer readable medium, such as the static storage component 408 or the disk drive component 410. In other embodiments, hard-wired circuitry may be used in place of or in combination with software instructions to implement the present disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 400. In various other embodiments of the present disclosure, a plurality of the computer systems 400 coupled by a communication link 424 to a network 426 (e.g., such as a LAN, WLAN, PTSN, and/or various other wired or wireless networks, including telecommunications, mobile, and cellular phone networks) may perform instruction sequences to practice the present disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A spurious input detection system, comprising:
a chassis;
a touch input display located on a first side of the chassis;
a touch input surface located on a second side of the chassis that is opposite the chassis from the first side; and a non-transitory, computer-readable medium including instructions that, when executed by a processor, provide a spurious input detection engine that is operable to:
receive a first input from the touch input display;
receive a second input from the touch input surface;
determine that the first input is a spurious input based on a combination of the first input and the second input;
disregard the first input in response to determining that the first input is a spurious input;
receive a third input from the touch input surface;
determine that the first input is no longer a spurious input base on a combination of the second input and the third input;
continue to disregard the first input subsequent to determining that the first input is no longer a spurious input;
detect a removal of the first input;
receive a fourth input from the touch input display; and
determine that the fourth input is in substantially the same location on the touch input display that the first input was received and, in response, accept the fourth input as a user input.

2. The system of claim 1, wherein the spurious input detection engine disregarding the first input in response to determining that the first input is a spurious input further comprises:
disabling a portion of the touch input display that received the first input.

3. The system of claim 1, wherein the chassis includes a plurality of edges extending between the first side of the chassis and the second side of the chassis, and wherein the touch input display extends between each of the plurality of edges.

4. The system of claim 1, further comprising:
a sensor that is operable to sense movement, wherein the spurious input detection engine is operable to receive a signal from the sensor that indicates movement, and wherein the determining that the first input is a spurious input is based on a combination of the first input, the second input, and the signal.

5. The system of claim 1, wherein the spurious input detection engine disregarding the first input in response to determining that the first input is a spurious input further comprises:
receiving the first input; and
removing the first input such that the first input is not transmitted to the processor.

6. The system of claim 1, wherein the spurious input detection engine determining that the first input is a spurious input based on a combination of the first input and the second input further comprises:
determining that the first input is a single thumb input; and
determining that the second input is a plurality of finger inputs that are each located adjacent a common edge of the touch input surface.

7. The system of claim 1, wherein the spurious input detection engine determining that the first input is no longer a spurious input based on a combination of the second input and the third input further comprises:
determining that the third input is a plurality of finger inputs that are each located adjacent a common edge of the touch input surface.

8. The system of claim 7, wherein the spurious input detection engine is further operable to:
determine that the first input is a single thumb input; and
determine that the fourth input is a single thumb input.

9. A tablet computing system, comprising:
a chassis including a first side and a second side that is opposite the chassis from the first side;
a processor housed in the chassis;
a touch input display located on the first side of the chassis;
a touch input surface located on the second side of the chassis; and
a non-transitory, computer-readable medium housed in the chassis, coupled to
the processor, and including instructions that, when executed by the processor, provide a spurious input detection engine that is operable to:
receive a first input from the touch input display;
receive a second input from the touch input surface;
determine that the first input from the touch input display is a spurious input based on a positioning of the first input from the touch input display and the second input from the touch input surface;
disregard the first input from the touch input display in response to determining that the first input from the touch input display is a spurious input;
receive a third input from the touch input surface;
determine that the first input from the touch input display is no longer a spurious input based on a combination of the second input from the touch input surface and the third input from the touch input surface;
continue to disregard the first input from the touch input display subsequent to determining that the first input from the touch input display is no longer a spurious input;
detect a removal of the first input from the touch input display;
receive a fourth input from the touch input display;
determine that the fourth input from the touch input display is in substantially the same location on the touch input display that the first input from the touch input display was received and, in response, accept the fourth input from the touch input display as a user input.

10. The system of claim 9, wherein the chassis includes an edge extending between the first side of the chassis and the second side of the chassis and about the perimeter of the chassis, and wherein the touch input display extends to the edge of the chassis about the perimeter of the chassis.

11. The system of claim 9, further comprising:
at least one sensor that is operable to sense movement and orientation, wherein the spurious input detection engine is operable to receive a signal from the at least one sensor that indicates movement and orientation, and wherein the determining that the first input is a spurious input is based on a combination of the first input from the touch input display, the second input from the touch input surface, and the signal.

12. The system of claim 9, wherein the spurious input detection engine disregarding the first input from the touch input display in response to determining that the first input from the touch input display is a spurious input further comprises:
disabling a portion of the touch input display that received the first input.

13. The system of claim 9, wherein the spurious input detection engine determining that the first input from the touch input display is a spurious input based on a combination of the first input from the touch input display and the second input from the touch input surface further comprises:
determining that the first input from the touch input display is a single thumb input; and determining that the second input from the touch input surface is a plurality of finger inputs that are each located adjacent a common edge of the touch input surface.

14. The system of claim 9, wherein the spurious input detection engine disregarding the first input from the touch input display in response to determining that the first input from the touch input display is a spurious input further comprises:
receiving the first input from the touch input display; and
removing the first input from the touch input display such that the first input from the touch input display is not transmitted to the processor.

15. The system of claim 9, wherein the spurious input detection engine determining that the first input from the touch input display is no longer a spurious input based on a combination of the second input from the touch input surface and the third input from the touch input surface further comprises:
determining that the third input from the touch input surface is a plurality of finger inputs that are each located adjacent a common edge of the touch input surface.

16. A method for detecting spurious inputs, comprising:
providing a chassis including a touch input display located on a first side of the chassis and a touch input surface located on a second side of the chassis that is opposite the first side;
receiving a first input from the touch input display;
receiving a second input from the touch input surface;
determining that the first input is a spurious input based on a combination of the first input and the second input;
disregard the first input in response to determining that the first input is a spurious input;
receive a third input from the touch input surface;
determine that the first input is no longer a spurious input based on a combination of the second input and the third input;
continue to disregard the first input subsequent to determining that the first input is no longer a spurious input;
detect a remove of the first input;
receive a fourth input from the touch input display; and
determine that the fourth input is in substantially the same location on the touch input display that the first input was received and, in response, accept the fourth input as a user input.

17. The method of claim 16, further comprising:
sensing movement of the chassis, wherein the determining that the first input is a spurious input is based on a combination of the first input, the second input, and the sensed movement of the chassis.

18. The method of claim 16, wherein the disregarding the first input in response to determining that the first input is a spurious input further comprises:
disabling a portion of the touch input display that received the first input.

19. The method of claim 16, wherein the determining that the first input is a spurious input based on a combination of the first input and the second input further comprises:
determining that the first input is a single thumb input; and
determining that the second input is a plurality of finger inputs that are each located adjacent a common edge of the touch input surface.

20. The method of claim 16, wherein the disregarding the first input in response to determining that the first input is a spurious input further comprises:
receiving a first input from the touch input display; and
removing the first input such that the first input is not transmitted to the processor.

* * * * *